United States Patent
Olthoff

(10) Patent No.: US 8,886,952 B1
(45) Date of Patent: Nov. 11, 2014

(54) METHOD OF CONTROLLING A TRANSACTION

(75) Inventor: Kenneth George Olthoff, Linthicum, MD (US)

(73) Assignee: The United States of America as represented by the Director of The National Security Agency, Washington, DC (US)

( * ) Notice: Subject to any disclaimer, the term of this patent is extended or adjusted under 35 U.S.C. 154(b) by 2104 days.

(21) Appl. No.: 12/001,597

(22) Filed: Dec. 6, 2007

(51) Int. Cl.
*G06F 21/00* (2013.01)

(52) U.S. Cl.
USPC .......................................... 713/186

(58) Field of Classification Search
USPC .......... 704/231–257, 273; 382/115–116, 118; 902/3–5; 340/5.52–5.53, 5.82–5.84; 713/186

See application file for complete search history.

(56) References Cited

U.S. PATENT DOCUMENTS

| | | | |
|---|---|---|---|
| 6,570,498 B1 | 5/2003 | Frost et al. | |
| 6,832,724 B2 | 12/2004 | Yavid et al. | |
| 7,233,684 B2 | 6/2007 | Fedorovskaya et al. | |
| 7,246,244 B2 | 7/2007 | Nanavati et al. | |
| 7,287,158 B2 | 10/2007 | Futamura et al. | |
| 7,421,097 B2 * | 9/2008 | Hamza et al. | 382/118 |
| 2006/0239512 A1 * | 10/2006 | Petrillo | 382/115 |

* cited by examiner

*Primary Examiner* — Dant Shaifer Harriman
(74) *Attorney, Agent, or Firm* — Rushni Kurian

(57) ABSTRACT

A method of securely authenticating a user's response to a challenge request before completing a transaction is disclosed. When a user wishes to complete a transaction, an image is projected onto the user's face. The user reads the image in a mirror and responds accordingly. If the user identifies the correct image, the transaction is allowed to proceed.

13 Claims, 1 Drawing Sheet

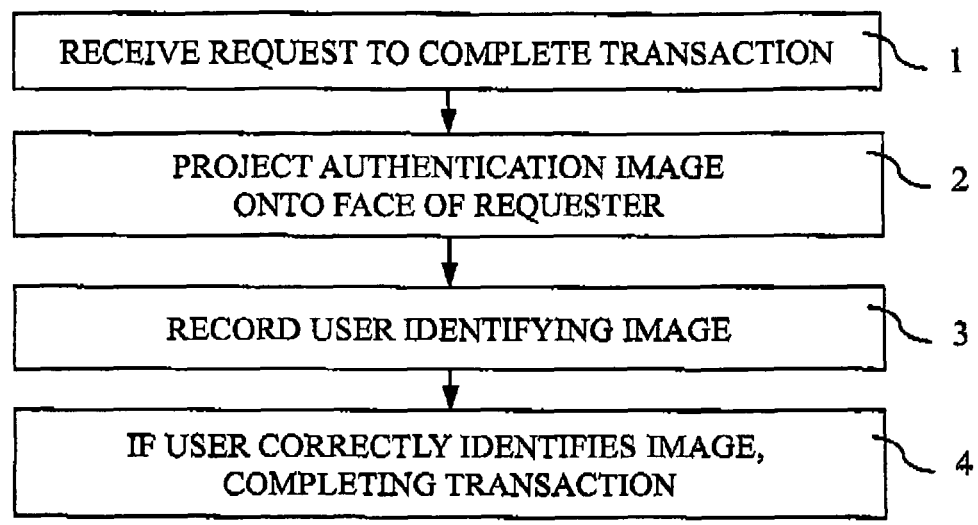

METHOD OF CONTROLLING A TRANSACTION

FIELD OF THE INVENTION

The present invention relates, in general, to computer system access, and, in particular to biometric acquisition and verification.

BACKGROUND OF THE INVENTION

In order to enhance security of access to computers or computer networks, or to enhance security of transactional activities, biometric data may be added to traditional password and PIN based controls. Prior art systems may also use facial recognition or video recording of user responses, and then bind that information cryptographically to transaction data.

U.S. Pat. No. 6,570,498, entitled "INTEGRATED ACCESS SYSTEM," discloses a system and method for enhancing access control with a video capture system that is used in conjunction with either a key or proximity card access system. One or more images of the face of a person requesting access is acquired and stored. The present invention does not operate as does the method disclosed in U.S. Pat. No. 6,570,498, which is hereby incorporated by reference into the specification of the present invention.

U.S. Pat. No. 6,832,724, entitled "ELECTRO-OPTICAL ASSEMBLY FOR IMAGE PROJECTION, ESPECIALLY IN PORTABLE INSTRUMENTS," discloses a system and method for displaying an image on a viewing surface. Although the present invention does project an image as part of the transaction verification/binding method disclosed below, the present invention does not project an image on a viewing surface, as does U.S. Pat. No. 6,832,724. U.S. Pat. No. 6,832,724 is hereby incorporated by reference into the specification of the present invention.

U.S. Pat. No. 7,233,684, entitled "IMAGING METHOD AND SYSTEM USING AFFECTIVE INFORMATION," discloses a system and method for capturing an image of a scene and collecting affective information. Affective information collected reflects the interpretation of the image by a photographer or the emotion evoked by the image. The present invention does not collect affective information and is directed toward transaction completion rather than corresponding an emotional reaction to an image. U.S. Pat. No. 7,233,684 is hereby incorporated by reference into the specification of the present invention.

U.S. Pat. No. 7,246,244, entitled "IDENTIFY VERIFICATION METHOD USING A CENTRAL BIOMETRIC AUTHORITY," discloses a method for enhancing an electronic transaction by the sender creating a message for both the receiver and a central authority, the central authority message containing the sender's biometric sample. If the receiver wishes to verify the sender's identity, the receiver may request the central authority verify the identity of the sender. The present invention is not directed towards verification of the identity of the sender. U.S. Pat. No. 7,246,244 is hereby incorporated by reference into the specification of the present invention.

U.S. Pat. No. 7,287,158, entitled "PERSON AUTHENTICATION SYSTEM, PERSON AUTHENTICATION METHOD, INFORMATION PROCESSING APPARATUS, AND PROGRAM PROVIDING MEDIUM," discloses a system for authenticating a person by comparing user template information against user information entered during a transaction. The data may include name, PKI certificate, periods of validity, etc., and may be encrypted to enhance security. The present invention is not directed toward collection and storage of generic information as is the system described in U.S. Pat. No. 7,287,158. U.S. Pat. No. 7,287,158 is hereby incorporated by reference into the specification of the present invention.

Also known in the art are prior art systems that show the transaction details on part of a computer screen, and the video of the acceptance in another window. These methods leave the user and the system owner with the possibility that the individual portions of the transaction can be either improperly bound or somehow separated or modified later. Even having the user hold up a written summary of the transaction details (sort of like in a police mug shot) is not foolproof, as it would be at least marginally easier to forge within the captured video than having the same written information projected onto the unique topography of the user's face.

There exists a need to conclusively bind the user's facial biometric information to a particular transaction in one secure and verifiable file.

SUMMARY OF THE INVENTION

It is an object of the present invention to bind transaction details or access control challenge/response data to a video of a user response. The present invention projects relevant information onto the user's face, allowing the users to look in a mirror on the apparatus to read or examine what is projected, and then recording the user speaking or gesticulating (head nod, for example) their response to the proposed transaction.

The response, incorporating the projected details, may alternatively be bound to existing credentials such as PKI certificates and compared to pre-registered PKI data and facial recognition templates, and utilized in accordance with protocols and other such systems that have previously been devised by others.

BRIEF DESCRIPTION OF THE DRAWING

FIG. 1 is a flowchart of steps of the present invention.

DETAILED DESCRIPTION OF THE INVENTION

The present invention is a method to bind transaction details or access control challenge/response data to a video of a user response.

The present method may be used in any situation where an existing system utilizes video capture of a user's facial response (speaking words, nodding head, or otherwise indicating a response) to a request for transaction confirmation or an access control challenge/response protocol.

The present invention may be used to access a secured space or computer system, to validate a sales transaction, or to validate any other user transaction.

A flowchart of the steps of the present invention is shown.

The first step 1 of the present method is receiving a request to complete a user-definable transaction, the request being initiated by a user. For instance, a user may be purchasing a mechanic's socket set, apples, or other goods.

The second step 2 of the present method is projecting an authentication image onto the user's face, the authentication image readable by the user. By way of example, the authentication image might be the price of the purchase, the item being purchased, or the last four digits of the credit card being used. By projecting the image backwards, the user could look in a mirror provided on a kiosk (perhaps a one-way mirror with the camera behind it) to read what was appearing at that moment on his or her face, and then perform the action, or speaking the words, to accept the transaction.

In an alternate embodiment, the authentication image is pseudo-randomly selected from a large pool of potential images by an access control system. The authentication image in this embodiment could be used for multiple purposes, either alone or in combination, depending on the circumstances.

For example, the random image could be used to prevent a replay of a previous signal between the authentication station and some central location, with the pseudo-random selection of the image displayed at a given point in time designed to presumably be more difficult to predict or forge than a simple time/date character string.

In an alternate embodiment, the present invention could also be used without any prior biometric (i.e. facial) template to provide a record of the person's access request that would be difficult to forge, and therefore, provide some degree of non-repudiation later, by means of correlation of the authentication image to the known time of use.

The image could also be used to serve as another form of authentication ("something the subject knows" in addition to the "something the person is" represented by the video of their face) as well as providing a further between the video data and the recognition aspects. For example, at the time of establishing the original facial geometry template, the user could be asked to choose a group of images from a large pool of choices. Upon requesting access, two or more of the images could be projected, with only one of those from the user's list. The user could then be prompted to point to the image displayed on their face that matches one on their pre-arranged list. Alternatively, the user could hold up the number of fingers that match the correct image, or otherwise identify the correct image by gesture or verbal response that is captured as part of the transaction process.

The third step 3 of the present method is recording the user identifying the authentication image in an access control application, or agreeing to the transaction information in a purchase or transaction authorization application.

In the fourth, and final, step 4 of the present method, if the recorded user identification of the authentication image matches the projected authentication image, the user-definable transaction is completed—either access is allowed or the transaction is approved.

In an alternate embodiment, captured transaction images or video is retained for future use, such as if the transaction was disputed. This alternate embodiment is especially useful when no pre-approved template exists.

In another alternate embodiment, the recorded video or image is a stereoscopic capture of the user's face.

In another alternate embodiment, biometric data of the user is compared against stored biometric data.

In another alternate embodiment, the user enters one or more pre-defined access control data, such as a PIN code, a proximity card, a credit card, or other like data. The access control data may be needed to complete the user-definable transaction.

In another alternate embodiment, the recorded user identified image is bound with at least one of biometric data, access control data, and public-key access control certificates. Biometric data may include a fingerprint, an iris print, a palm print, a facial feature print, a voice print, or any combination thereof.

Persons skilled in the art will recognize that time and date stamp may be added for better binding, storage and retrieval purposes.

The major advantage of the present method is that it tightens the coupling between the video recording of the user's response and the transaction details. In a system where the transaction information is bound to the image/video recording after the recording is captured, both the user and the system operator need to be concerned that the details of transaction A might be accidentally or maliciously be bound to the response from transaction B. This may occur by the other party to the transaction, an unknown third party, or a system failure of some sort. In the present invention, the details of the transaction are projected on the user's face and the video/image capture of the user's response by definition must incorporate the details of the relevant transaction, and the user has the "real time" opportunity to see the details and respond. The greatest advantage of such binding is in real-time transactions, as one must presume that advances in technology will eventually allow undetected alteration or forgery of such videos, given enough time and effort.

While the preferred embodiments of the invention have been illustrated and described, it will be apparent to those of ordinary skill in the art that various changes and modifications may be made without deviating from the inventive concepts set forth above.

What is claimed is:

1. A method of adding personal identification to a transaction, comprising the steps of:
   a) receiving, on a system, a request to complete a user-definable transaction, the request being initiated by a user;
   b) projecting, from said system, an authentication image onto the face of the user, the authentication image readable by the user;
   c) recording, by said system, the user responding to the authentication image where the response is selected from the group of responses consisting of speaking, making a gesture, or any other suitable physical response; and
   d) completing the user-definable transaction based on acceptance, by said system, of the user's response.

2. The method of claim 1, further comprising the step of comparing at least one biometric data of the user against stored biometric data for the user on said system.

3. The method of claim 2, further comprising the user entering a pre-defined access control data, into said system, the access control data needed to complete the user-definable transaction.

4. The method of claim 3, further comprising binding, by said system, the result of step (c), with at least one of biometric data, access control data, and public-key access control certificates.

5. The method of claim 4, wherein the authentication image is randomly selected by said system and is related to the transaction the user is requesting to complete.

6. The method of claim 5, wherein the biometric data is selected by said system from the group of biometric data consisting of fingerprint, iris print, palm print, facial feature print, voice print, and any combination thereof.

7. The method of claim 6, wherein the recorded response from the user is saved by the system for a user-definable period of time.

8. The method of claim 7, wherein the step of recording, by said system, the user responding to the authentication image further comprises capturing at least one stereoscopic image.

9. The method of claim 1, further comprising the user entering a pre-defined access control code into said system, the access control code needed to complete the user-definable transaction.

10. The method of claim 1, wherein the authentication image is randomly selected by said system and is related to the transaction the user is requesting to complete.

11. The method of claim 1, further comprising binding, by said system, the result of step (c) with at least one of biometric data, access control data, and public-key access control certificates.

12. The method of claim 1, wherein the recorded response from the user is saved by said system for a user-definable period of time.

13. The method of claim 1, wherein the step of recording, by said system, the user responding to the authentication image further comprises capturing at least one stereoscopic image.

* * * * *